United States Patent [19]

Tobias

[11] 4,341,682
[45] Jul. 27, 1982

[54] COMPOSITION COMPRISING ESTER OF EPOXY, CARBONYL CONTAINING POLYBUTADIENE POLYMER AND ACID CONTAINING ADDITION POLYMER, AND AQUEOUS COATING COMPOSITIONS PREPARED THEREFROM

[75] Inventor: Michael A. Tobias, Bridgewater, N.J.

[73] Assignee: Mobil Oil Corporation, New York, N.Y.

[21] Appl. No.: 219,470

[22] Filed: Dec. 23, 1980

[51] Int. Cl.$^3$ ............................................ C08L 13/00
[52] U.S. Cl. .................................... 523/409; 525/108; 525/109; 525/110; 525/531; 525/922; 523/406
[58] Field of Search ............... 260/29.6 NR, 29.7 NR; 525/922, 108, 109, 110, 531

[56] References Cited

U.S. PATENT DOCUMENTS

| | | | |
|---|---|---|---|
| 3,892,819 | 7/1975 | Najvar | 525/531 |
| 4,126,596 | 11/1978 | Schimmel et al. | 260/29.6 NR |
| 4,151,131 | 4/1979 | Sekmakas | 260/29.6 NR |
| 4,247,439 | 1/1981 | Matthews et al. | 260/29.6 NR |

Primary Examiner—Joseph L. Schofer
Assistant Examiner—N. Sarofim
Attorney, Agent, or Firm—Charles A. Huggett; Michael G. Gilman; Edward J. Trojnar

[57] ABSTRACT

Non-gelled compositions containing hydroxy ester copolymer having carboxyl groups and substantially free of oxirane groups are disclosed which are the esterification reaction product of (a) acidic addition copolymer; and
(b) a polyepoxide which has been partially defunctionalized by reaction with carboxyl containing polybutadiene polymer. The resulting composition is neutralized with amine, is self-emulsifiable in water and is useful for coatings.

7 Claims, No Drawings

COMPOSITION COMPRISING ESTER OF EPOXY, CARBONYL CONTAINING POLYBUTADIENE POLYMER AND ACID CONTAINING ADDITION POLYMER, AND AQUEOUS COATING COMPOSITIONS PREPARED THEREFROM

BRIEF DESCRIPTION OF THE INVENTION

This invention relates to compositions suitable for coatings. In particular, the compositions of this invention are self-emulsifiable in water, comprise a nongelled hydroxy ester copolymer containing carboxyl groups, and are substantially free of oxirane functionality. The hydroxy-ester copolymer is the esterification reaction product of an acidic addition copolymer and an epoxy resin which has been partially defunctionalized by reaction with a carboxyl containing polybutadiene polymer or copolymer.

The acidic addition copolymer is a solution copolymer of alpha, beta monoethylenically unsaturated monomers comprising at least about 10 weight percent of alpha, beta monoethylenically unsaturated carboxylic acid, based on the total weight of monomers. The partially defunctionalized epoxy resin constitutes at least about 25 weight percent of the total resin solids content and has sufficient oxirane groups to provide a ratio of oxirane groups to carboxyl groups in the acidic copolymer of from 0.5:1 to 0.05 to 1. The epoxy resin is partially defunctionalized by esterification with a carboxyl containing polybutadiene polymer. At least some of the carboxyl groups in the final copolymer-epoxy resin hydroxy ester are reacted with a base to render the composition self-emulsifiable in water. The resulting compositions are useful as coatings, particularly as metal coatings containing pigment, which are cured by baking. An aminoplast or phenoplast resin in small proportion may be added to enhance the cure on baking.

DETAILED DESCRIPTION OF THE INVENTION

Epoxy resins, particularly those containing a plurality of aromatic groups, are joined together by ether linkages and provide excellent physical and chemical properties. It has been difficult to employ such resins in aqueous media because they lack storage stability. This often is desirable and is of particular importance when spray application is contemplated. The slightest change in the pH of the aqueous composition as a result of hydrolytic instability results in a marked change in the viscosity and application properties of the coating.

To obtain aqueous coatings of proper resin solids content and viscosity, it has often been necessary in the trade to employ an emulsion system in which a water immiscible component is suspended in an aqueous continuous phase with an emulsifying agent. Such emulsion systems are intrinsically unpredictable since the particle size of the emulsion will vary with the agitation of the composition. This invention provides self-emulsifiable compositions in which the particle size of the emulsion is substantially the same regardless of whether high speed agitation is used or whether the mixture with water is barely stirred.

Compositions which are similar in some respects to the composition of this invention are disclosed in pending U.S. application Ser. No. 095,682, abandoned, filed Nov. 19, 1979, but there are significant differences which will be apparent from the subsequent disclosure.

The pending U.S. application of George Brown and Arthur T. Spencer, Ser. No. 095,682 abandoned, filed Nov. 19, 1979, discloses aqueous compositions which are the esterification product of an acidic addition copolymer and a mixture containing epoxy resin which has been partially defunctionalized by reaction with an epoxy reactive material, such as a phenol; a bisphenol; an acid, such as benzoic acid or octanoic acid; or an alcohol, such as octanol. Carboxyl containing butadiene polymers are not mentioned as defunctionalizing agents.

In general, any polyfunctional epoxy resin containing more thhan one 1,2-epoxy group and having an epoxy equivalent weight of 200 to about 1000 can be used to prepare the compositions of this invention. Preferably, the epoxy resin is an aromatic polyether polyepoxide.

Aromatic polyethers, polyether epoxides and particularly diglycidyl ethers, are well known and available in commerce. The usual aromatic polyether backbone of the epoxy resin is based on a bisphenol which defines a pair of phenolic groups joined together through an intervening divalent hydrocarbon. The preferred bisphenols have the formula:

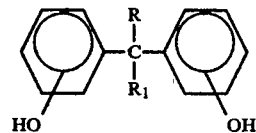

in which R and $R_1$ are hydrogen or alkyl groups containing up to 8 carbon atoms. Bisphenol A is particularly preferred. In this compound, the two OH groups are in the para position and R and $R_1$ are each methyl.

The epoxy resins which are used herein possess hydroxy groups in addition to epoxy groups. The higher the molecular weight of the epoxy resin the more hydroxy groups are present. In addition, when the epoxy resin is partially defunctionalized by reaction with carboxyl containing polybutadiene polymer additional hydroxy groups are provided. These hydroxy groups can participate in the final curing reaction.

The carboxyl containing polybutadiene diene polymer can be a homopolymer or copolymer of at least about 50 weight percent butadiene with another monomer, for example styrene, and containing carboxyl groups. Such materials are commercially available, particularly as alpha, omega-polybutadiene dicarboxylic acid, which is available as N1SSO-PB C-1000. A variety of related materials are suitable, the essential requirements being the presence of carboxyl groups and the unsaturated sites in the polymer.

The remaining main component of the final copolymer compositions of this invention is an addition copolymer of monoethylenically unsaturated monomers comprising at least about 10 weight percent of monoethylenically unsaturated carboxylic acid, based on the total weight of monomers. These copolymers are themselves well known. The balance of the copolymer is preferably non-reactive under the contemplated conditions of polymerization, prereaction with the epoxy resin, and cure, but small amounts of other reactive monomers may be tolerated. Examples of other suitable reactive monomers are hydroxy monomers such as 2-hydroxy ethyl methacrylate, amide monomers such as acrylamide, and N-methylol monomers such as N-methylol acrylamide.

The non-reactive monomers are, for example, acrylate and methacrylate esters, such as ethyl acrylate, methyl methacrylate or isobutyl methacrylate, styrene, para-methyl styrene, vinyl toluene, vinyl acetate, vinyl chloride, vinylidene chloride, acrylonitrile, and the like. Their function is to enhance solvent solubility and film formation.

The carboxyl-functional monomer must be present in the addition copolymer in a relatively high amount so that the final polymer reaction with the epoxy-butadiene polymer ester will contain the requisite carboxyl groups. The preferred minimum proportion of carboxyl monomer is 10 weight percent of the weight of the monomers. Methacrylic acid provides the best hydrolytic stability and is very much preferred, but other acids are also useful, such as fumaric acid, acrylic acid, crotonic acid, itaconic acid, and the like. Up to about 25 weight percent of the monomers can be carboxyl functional, but the maximum proportion is more generally determined by retention of solvent solubility of the copolymer. Generally, the carboxyl monomer content is in the range of 10-20 weight percent to give a polymer with an acid number in the range of 95-130. The number average molecular weight ($M_m$) of the carboxyl containing addition copolymer is generally in the range of 2500 to 7500 to give a glass transition temperature of from $-25°$ to $+25°$ C. Molecular weight can be controlled by monomer content during polymerization or catalyst concentration, or polymerization temperature, these being known expedients for this purpose. Mercaptan chain termination is preferably avoided when sanitary can use is contemplated as mercaptans have an offensive odor.

The partially defunctionalized epoxy resin is prepared by reacting the epoxy resin and the carboxy containing butadiene polymer in a solvent at an elevated temperature until the acid number is less than 2 and the epoxy content is 0.25 to 0.75 meq./g. Typically, the proportions of epoxy resin and carboxy containing butadiene polymer are such that the ratio of carboxyl equivalents to epoxy equivalents is in the range of 0.3:1 to 0.7:1.

The esterification reaction between the oxirane groups of the partially defunctionalized epoxy resin and carboxyl groups of the addition copolymer is a conventional reaction which is normally carried out in the presence of a small amount of a tertiary amine esterification catalyst, e.g., N,N-dimethylethanolamine. The catalyst is normally used in an amount of from 1 to 6 weight percent of the materials subjected to esterification. Preferably, the catalyst comprises 3 to 5 weight percent of the reactants. The proportions of partially defunctionalized epoxy resin and acidic addition copolymer are such that the ratio of oxirane groups in the defunctionalized epoxy resin to the carboxyl groups in the addition copolymer is from 0.5:1 to 0.05:1, preferably 0.25:1 to 0.1:1. The reaction is conducted until the acid number of the product is between about 35 to 75 mg. KOH/g, preferably 50 to 60 mg. KOH/g.

The compositions of this invention form films with reasonably good properties on baking in the absence of any external curing agent. However, from 1-25 weight percent of the curing agents such as aminoplast resins, phenoplast resins and mixtures thereof will serve to enhance the cure. With analogous prior art polymers at least 15 weight percent of curing agent, based on the total weight of polymer is normally required. While such levels of curing agents are useful with the hydroxy ester copolymers of this invention, this invention is unusual in enabling the achievement of a superior cure using a smaller proportion of curing agent. For example, 2-12 weight percent is entirely sufficient to cure films containing the hydroxy ester copolymers of this invention. The advantage is using reduced amounts of curing resin is that the small proportion of curing agent needed to provide the desired solvent insolubility results in less brittleness in the cured film.

The preferred curing agents are water dispersible. These will be illustrated by hexamethoxy methyl melamine, or by A stage phenol-formaldehyde resols. However, the compositions of this invention are emulsions and water dispersibility of the curing agent is not essential.

The curing of compositions containing curing agent by baking, is entirely conventional in the art. Presumably, the methylol groups introduced by the curing agent react with the hydroxy and carboxyl groups present in the copolymer, and with the hydroxy present in the aromatic polyether devoid of oxirane functionality. Acidic curing agents are commonly employed to facilitate the cure, though this is not essential, especially when a phenoplast curing agent is used.

In the preferred use of the compositions of this invention from about 3 to about 10 weight percent of water dispersible aminoplast resin is added to the mixture to assist in cure on baking.

The films exhibit good impact resistance particularly in pigmented systems, and good stability with corrosion inhibitive pigments. Such compositions are emminently suitable for metal coatings.

By virtue of the unsaturation introduced by the presence of the carboxyl containing polybutadiene the compositions of this invention are capable of air drying and will undergo free radical initiated cure.

The resins of this invention are typically used by dissolution in a volatile organic solvent. A wide variety of solvents are suitable. In general, any solvent which does not interfere with the achievement of an emulsion when the acidic copolymer salts are diluted with water can be used. The point at which an emulsion is achieved is easily observed. It occurs when the aqueous system changes from clear to milky.

Organic solvents of limited water miscibility, such as xylene, toluene, and butanol are useful, and they may be used alone or together with water miscible solvents, such as 2-ethoxy ethanol or methyl ethyl ketone.

The aqueous coating compositions of this invention are primarily useful for coating aluminum, tinplated steel, pretreated metals, steel, or metals coated with the same or different resin compositions, i.e., a second coat. These aqueous compositions also can be used for coating other substrates, such as wood. The most preferred and advantageous use of the coating compositions is metal primers containing large amounts of pigments, e.g. 1 to 60 weight percent. Such compositions contain enough amine for salt formation with from 50 to 90 percent of the available carboxyl groups and enough water to provide a final solids content of about 10 to about 50 weight percent. The pH of these compositions is generally 6-9, preferably 7-8, and they have a viscosity of about 10 to 1000 centipoise. After application, the coating is baked for about 5 seconds to about 30 minutes at between about 250° F. and about 600° F. A typical bake is for about 2 minutes at about 400° F.

The invention is illustrated in the following examples.

EXAMPLE

Epon 1004* (294.0 gms, 1.12 meq. epoxy/gm) was reacted for one hour at 160° C. with Nisso-PB C-1000 alpha, omega polybutadiene dicarboxylic acid (100.0 gms, 1.03 meq. carboxyl/gm) in the presence of 1.2 g of tri-n-butylamine to afford a product with an acid number of 1.1 mg KOH/gm and an epoxy value of 0.57 meq epoxy/gm. This epoxy-ester was subsequently reacted for one hour at 125° C. with a preformed acrylic copolymer (770.0 gms, 60% NV in Butyl Cellosolve) composed of 18.9% methacrylic acid, 56.5% butyl acrylate, and 24.6 methyl methacrylate in the presence of 45.1 gms of dimethylethanolamine. The resulting epoxy-ester acrylic copolymer was reduced with 1435.7 gms of deionized water to yield a dispersion with the following properties; pH=7.50, Viscosity=600 cps, Acid Number=48.8 mg KOH/gm, and percent nonvolatiles $(NV)$=32.0.

*Epon 1004 is an aromatic polyether expoxide which is the reaction product of Bisphenol A and epichlorohydrin having molecular weight of about 1400 and available from Shell.

I claim:

1. A composition comprising a stable aqueous emulsion of an adduct neutralized with sufficient base to render it emulsifiable in water, in which said adduct contains carboxyl groups, is substantially free of oxirane groups, and comprises the esterification reaction product of
   (a) an acidic copolymer comprising a solution copolymer of monoethylenically unsaturated monomers containing at least 10 weight percent of monoethylenically unsaturated carboxylic acid monomer based on the total weight of the monomers; and
   (b) a partially defunctionalized epoxy resin containing free epoxide groups, which is the reaction product of polyepoxide and a carboxyl containing polybutadiene polymer.

2. The composition of claim 1 in which said partially defunctionalized epoxy resin is the reaction product of an aromatic polyether epoxide and an alpha, omega polybutadiene dicarboxylic acid.

3. The composition of claim 2 which is emulsified in water in the substantial absence of added emulsifying agent.

4. The composition of claims 1 or 2 in which said monoethylenically unsaturated carboxylic acid monomer is methacrylic acid.

5. The composition of claims 1 or 2 in which said aromatic polyether epoxide has an epoxy equivalent weight of between 200 and 1000.

6. The composition of claims 1 or 2 which further contains from 1 to 25 weight percent of a curing agent selected from aminoplast resins, phenoplast resins, and mixtures thereof, based on the weight of the total resin content.

7. A stable aqueous emulsion comprising the composition of claims 1 or 2 in which amine is used to form a salt with from 50 to 90 percent of the available carboxyl groups, and water is present in an amount to provide a solids content of about 10 to 50 percent.

* * * * *